United States Patent
Aoyama

(10) Patent No.: US 7,240,063 B2
(45) Date of Patent: Jul. 3, 2007

(54) SYSTEM FOR GETTING CONVERSION RULES

(75) Inventor: Kazuyuki Aoyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 10/637,494

(22) Filed: Aug. 11, 2003

(65) Prior Publication Data
US 2005/0080755 A1    Apr. 14, 2005

Related U.S. Application Data

(63) Continuation of application No. 09/655,493, filed on Sep. 5, 2000, now abandoned.

(30) Foreign Application Priority Data

Jan. 27, 2000 (JP) ............................. 2000-023356

(51) Int. Cl.
G06F 7/00 (2006.01)
G06F 17/30 (2006.01)
(52) U.S. Cl. .......................... 707/100; 707/3
(58) Field of Classification Search ................ 719/383; 715/511; 705/5; 707/3, 4, 104.1, 100
See application file for complete search history.

(56) References Cited

U.S. PATENT DOCUMENTS

| | | | |
|---|---|---|---|
| 4,860,214 A | 8/1989 | Matsuda et al. | |
| 5,067,091 A * | 11/1991 | Nakazawa | 716/3 |
| 5,504,890 A | 4/1996 | Sanford | |
| 5,708,828 A | 1/1998 | Coleman | |
| 6,034,314 A * | 3/2000 | Koike | 84/600 |
| 6,715,128 B1 * | 3/2004 | Hirashima et al. | 715/511 |
| 6,820,266 B1 * | 11/2004 | Minakawa et al. | 719/313 |
| 2002/0178034 A1 * | 11/2002 | Gardner et al. | 705/5 |
| 2003/0187705 A1 * | 10/2003 | Schiff et al. | 705/5 |

FOREIGN PATENT DOCUMENTS

JP    2001318938 A    11/2001

* cited by examiner

*Primary Examiner*—Sam Rimell
(74) *Attorney, Agent, or Firm*—Mattingly, Stranger, Malur & Brundidge, P.C.

(57) ABSTRACT

A virtual intermediate data is prepared between the input data and the output data by an operator himself. The operator defines a first conversion rule for converting the input data into the intermediate data and a second conversion rule for converting the intermediate data into the output data and derives a conversion rule for directly converting the input data into the output data on the basis of the first and second conversion rules. This makes it easy to define and maintain the data conversion rule for transmitting the data among a plurality of systems and further improve the processing efficiency of the conversion.

8 Claims, 15 Drawing Sheets

FIG.3

| TABLE ID | TABLE NAME | ADAPTER ID |
|---|---|---|
| T001 | ORGANIZATION TABLE 1 | ADPT01 |
| T002 | ORGANIZATION STRUCTURE TABLE | ADPT01 |
| T003 | ORGANIZATION TABLE 3 | |
| T004 | ORGANIZATION TABLE 2 | ADPT02 |

FIG.4

| ITEM ID | DATA ITEM NAME | BELONGING TABLE | KEY ITEM |
|---|---|---|---|
| A001 | ORGANIZATION CODE | T001 | T |
| A002 | ORGANIZATION NAME | T001 | F |
| A003 | ORGANIZATION CODE | T002 | T |
| A004 | UPPER ORGANIZATION CODE | T002 | F |
| A005 | ORGANIZATION CODE | T003 | T |
| A006 | ORGANIZATION NAME | T003 | F |
| A007 | UPPER ORGANIZATION CODE | T003 | F |
| A008 | OFFICE CODE | T003 | F |
| A009 | ORGANIZATION CODE | T004 | T |
| A010 | ORGANIZATION NAME | T004 | F |
| A011 | UPPER ORGANIZATION CODE | T004 | F |

FIG.5

| CONVERSION RULE ID | CONVERSION RULE NAME | REFERENCE INPUT TABLE | OUTPUT TABLE |
|---|---|---|---|
| R001 | CONVERSION RULE 1 | T001 | T003 |
| R002 | CONVERSION RULE 2 | T002 | T004 |

| EXTRACTION RULE ID | CONVERSION RULE | EXTRATION CONDITION |
|---|---|---|
| E001 | E002 | A008='03' |

FIG.7

| ITEM CONVERSION RULE ID | CONVERSION RULE | OUTPUT ITEM | OUTPUT EXPRESSION |
|---|---|---|---|
| D001 | R001 | A005 | A001 |
| D002 | R001 | A006 | A002 |
| D003 | R001 | A007 | GetRef("A004","T002","A003=A001") |
| D004 | R001 | A008 | StrChop(0,2 "A001") |
| D005 | R002 | A009 | A005 |
| D006 | R002 | A010 | A006 |
| D007 | R002 | A011 | A007 |

FIG.8

| ORGANIZATION CODE | ORGANIZATION NAME |
|---|---|
| 011000 | TOKYO HEAD OFFICE |
| 012001 | GENERAL AFFAIRS DEPARTMENT |
| 013001 | GENERAL AFFAIRS SECTION |
| 012002 | MATERIALS DEPARTMENT |
| 013002 | MATERIALS SECTION |
| 012003 | ACCOUNTING DEPARTMENT |
| 013003 | ACCOUNTING SECTION |
| 012004 | SALES DEPARTMENT |
| 013004 | SALES 1 SECTION |
| 013005 | SALES 2 SECTION |
| 013006 | SALES 3 SECTION |
| 031000 | YOKOHAMA BRANCH |
| 032001 | GENERAL AFFAIRS DEPARTMENT |
| 033001 | GENERAL AFFAIRS SECTION |
| 032002 | MATERIALS DEPARTMENT |
| 033002 | MATERIALS SECTION |
| 032003 | ACCOUNTING DEPARTMENT |
| 033003 | ACCOUNTING SECTION |
| 032004 | SALES DEPARTMENT |
| 033004 | SALES 1 SECTION |
| 033005 | SALES 2 SECTION |

FIG.9

| ORGANIZATION CODE | UPPER ORGANIZATION CODE |
|---|---|
| 011000 | NULL |
| 012001 | 011000 |
| 013001 | 012001 |
| 012002 | 011000 |
| 013002 | 012002 |
| 012003 | 011000 |
| 013003 | 012003 |
| 012004 | 011000 |
| 013004 | 012004 |
| 013005 | 012004 |
| 013006 | 012004 |
| 031000 | NULL |
| 032001 | 031000 |
| 033001 | 032001 |
| 032002 | 031000 |
| 033002 | 032002 |
| 032003 | 031000 |
| 033003 | 032003 |
| 032004 | 031000 |
| 033004 | 032004 |
| 033005 | 032004 |

FIG.10

| ORGANIZATION CODE | ORGANIZATION NAME | UPPER ORGANIZATION CODE |
|---|---|---|
|  |  |  |

FIG.11

| CONVERSION RULE ID | CONVERSION RULE NAME | REFERENCE INPUT TABLE | OUTPUT TABLE |
|---|---|---|---|
| R003 |  | T001 | T004 |

FIG.12

| EXTRACTION RULE ID | CONVERSION RULE | EXTRACTION CONDITION |
|---|---|---|
| E001 | R003 | strChop(0,2,"A001")='03' |

FIG.13

| ITEM CONVERSION RULE ID | CONVERSION RULE | OUTPUT ITEM | OUTPUT EXPRESSION |
|---|---|---|---|
| D008 | R003 | A009 | A001 |
| D009 | R003 | A010 | A002 |
| D010 | R003 | A011 | GetRef("A004","T002","A003=A001") |

FIG.14

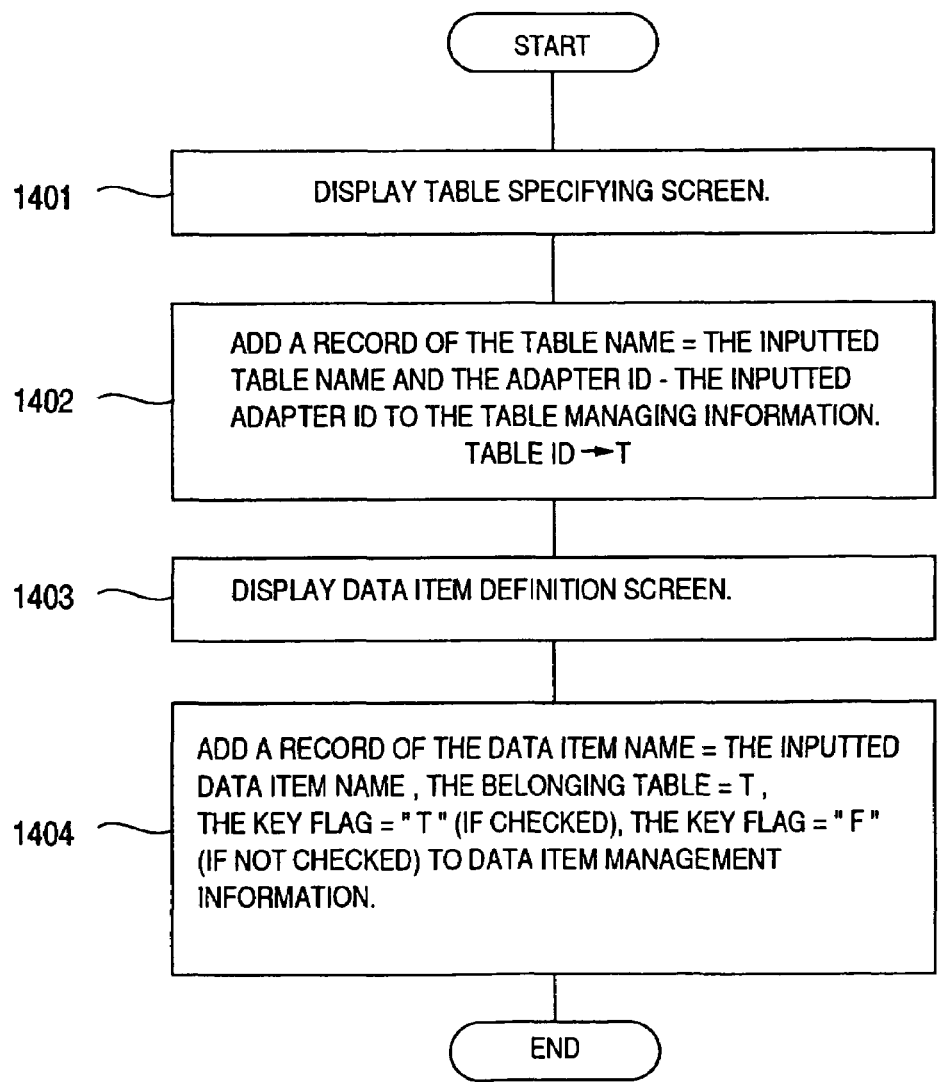

START

1401 — DISPLAY TABLE SPECIFYING SCREEN.

1402 — ADD A RECORD OF THE TABLE NAME = THE INPUTTED TABLE NAME AND THE ADAPTER ID - THE INPUTTED ADAPTER ID TO THE TABLE MANAGING INFORMATION. TABLE ID → T

1403 — DISPLAY DATA ITEM DEFINITION SCREEN.

1404 — ADD A RECORD OF THE DATA ITEM NAME = THE INPUTTED DATA ITEM NAME , THE BELONGING TABLE = T , THE KEY FLAG = " T " (IF CHECKED), THE KEY FLAG = " F " (IF NOT CHECKED) TO DATA ITEM MANAGEMENT INFORMATION.

END

FIG.15

```
TABLE DEFINITION INPUT SCREEN

TABLE NAME    ORGANIZATION TABLE 3   ──1501
ADAPTER ID    [            ]         ──1502

[COMPLETION]  ──1503
```

FIG.16

```
DATA ITEM DEFINITION INPUT SCREEN
TABLE NAME : ORGANIZATION TABLE 3
ADAPTER ID :
         DATA ITEM NAME          KEY ITEM
                                          ╲
1601 ── ORGANIZATION CODE           □      ╲─1602
        ORGANIZATION NAME           □
        UPPER ORGANIZATION CODE     □
        OFFICE CODE                 □
                                    □
                                    □

[COMPLETION] ──1603
```

FIG.17

| TABLE ID | TABLE NAME | ADAPTER ID |
|---|---|---|
| T001 | ORGANIZATION TABLE 1 | ADPT01 |
| T002 | ORGANIZATION STRUCTURE TABLE | ADPT01 |
| T004 | ORGANIZATION TABLE 2 | ADPT02 |

FIG.18

| ITEM ID | DATA ITEM NAME | BELONGING TABLE | KEY ITEM |
|---|---|---|---|
| A001 | ORGANIZATION CODE | T0C1 | T |
| A002 | ORGANIZATION NAME | T0D1 | F |
| A003 | ORGANIZATION CODE | T0C2 | T |
| A004 | UPPER ORGANIZATION CODE | T002 | F |
| A009 | ORGANIZATION CODE | T004 | T |
| A010 | ORGANIZATION NAME | T004 | F |
| A011 | UPPER ORGANIZATION CODE | T004 | F |

| ORGANIZATION CODE | ORGANIZATION NAME | UPPER ORGANIZATION CODE |
|---|---|---|
| 031000 | YOKOHAMA BRANCH | NULL |
| 032001 | GENERAL AFFAIRS DEPARTMENT | 031000 |
| 033001 | GENERAL AFFAIRS SECTION | 032001 |
| 032002 | MATERIALS DEPARTMENT | 031000 |
| 033002 | MATERIALS SECTION | 032002 |
| 032003 | ACCOUNTING DEPARTMENT | 031000 |
| 033003 | ACCOUNTING SECTION | 032003 |
| 032004 | SALES DEPARTMENT | 031000 |
| 033004 | SALES 1 SECTION | 032004 |
| 033005 | SALES 2 SECTION | 032004 |

SYSTEM FOR GETTING CONVERSION RULES

This application is a continuation of, and claims priority from, parent application U.S. patent application Ser. No. 09/655,493, filed Sep. 5, 2000 now abandoned.

BACKGROUND OF THE INVENTION

The present invention relates to a technology of deriving a data conversion rule concerning transfer of data among different kinds of systems which technology is required in developing a complicated system by associating different kinds of systems, and the technology of implementing the data conversion.

Recently, a remark is placed on the technology of building a complicated system for offering a new service function for a short term and at low cost by associating the different kinds of existing systems.

Since each of the different kinds of systems has the mapping data format including a structure, a type and a code system of the data to be treated, the conversion of the data format among the different kinds of systems is indispensable for the purpose of transferring data among the different kinds of systems.

For this purpose, the technology has been proposed of converting the data according to the programmer's defined rules of the data conversion among the different kinds of systems or automatically creating a program for converting the data according to the data conversion rules.

These technologies are arranged to read as schema the data formats of the systems A and B that are different from each other and allow the programmer of the complicated system to map the data item in the system A to the data item in the system B, thereby defining the conversion rule.

In order to do mapping between these data items, however, the programmer has been required to have a good acknowledge on the data formats of both the systems A and B.

In the case of introducing the system C for newly receiving the data from the system A and then associating the system A with the system C, the programmer of the complicated system having a knowledge on the data formats of the systems A and C is required to take an operating step of mapping the data items with each other.

Further, if the system A is changed into the system A' in this state, it is necessary to change the definition of the conversion rule of the data formats of the systems A and B and the definition of the conversion rule of the data formats of the systems A and C in a manner to make those definitions valid in the system A'.

As disclosed in U.S. Pat. No. 5,708,828, therefore, when converting the data format of the system A into that of the system B, the technology has been proposed of providing a general-purpose and common type of intermediate data developed by the programmer of the complicated system, temporarily converting the data of the system A into the intermediate data on the basis of the rule of the conversion from the data format of the system A into the format of the intermediate data, defined by the programmer of the complicated system, and converting the intermediate data into the data of the system B on the basis of the rule of conversion from the format of the intermediate data into the data format of the system B.

This technology is arranged so that the programmer of the complicated system may execute the definition of the rule of the conversion from the format of the intermediate data developed by the programmer himself into the data format of each system to be associated therewith.

Hence, the programmer of the complicated system having a good knowledge on the system A executes the definition of the rule of the conversion from the data format of the system A into the format of the intermediate data, while the programmer of the complicated system having a good knowledge on the system B executes the definition of the rule of the conversion from the format of the intermediate data into the data format of the system B. These operations do not require each programmer to have any knowledge on all the systems about the association and are required to proceed concurrently.

In a case that a plurality of systems such as a system B and a system C are provided for receiving data from the system A, if the system A is changed into the new system A', it is just necessary to change only the rule of the conversion from the data format of the system A into the intermediate data format.

SUMMARY OF THE INVENTION

The technology of temporarily creating the intermediate type data has a problem that a storage area is required to be secured for storing a great amount of data in the intermediate format especially in the case of transferring a great amount of data consisting of lots of records among different kinds of systems.

Further, this technology has a problem that the cost of the process is twice as high since the process needs two conversions.

In a case that a plurality of systems such as a system B and a system C are provided for receiving data from the system A, if those systems need the latest data located in the system A, the technology requires the data not required by the systems B and C included in the data of the system A to be converted into the intermediate data. This technology thus has a problem that the conversion process costs too much.

In a case that the conversion from the data format of the system A into the intermediate data format is done only once and the resulting intermediate data is converted into the data of the systems B and C, the data received by the systems B and C is made to be the data of the system A at a previous time point, that is, the time point when the data format of the system A is converted into the intermediate data format, so that the systems B and C cannot receive the latest data.

It is an object of the present invention to provide a system for deriving a conversion rule in which the programmer of the complicated system enables to define the data conversion rule among the different kinds of systems by the easy method of definition and maintenance and the processing cost is the same as the process of directly converting the data.

In order to carry out the foregoing object, according to an aspect of the invention, a conversion rule deriving system for deriving another conversion rule from a plurality of data conversion rules for transferring data among a plurality of systems, includes: an input unit for inputting a first conversion rule for defining the rule for converting the data of a first data format into the data of a second data format and a second conversion rule for defining the rule for converting the data of the second data format into the data of a third data format; and a conversion rule deriving unit for deriving the conversion rule for converting the data of the first data format into the data of the third data format on the basis of the inputted first and second conversion rules.

Further, a conversion rule deriving system for deriving another data conversion rule from a plurality of data conversion rules for transferring data among a plurality of systems, includes: an input unit for inputting a first conversion rule defined by the data items of first and second tables for converting the data of the first table into the data of the second table and a second conversion rule defined by the data items of the second and a third tables for converting the data of the second table into the data of the third table; and a conversion rule deriving unit for deriving a third conversion rule defined by using the data items of the first and the third tables for converting the data of the first table into the data of the third table on the basis of the inputted first and second conversion rule.

The conversion rule deriving system further includes a conversion rule input unit having: first means for inputting a first icon that represents the first data item of the first table and means for displaying the first icon; second means for inputting a second icon that represents a second data item of the second table and means for displaying the second icon; and third means for inputting a third icon having the first icon as a start point and the second icon as an end point, the start point and the end point representing the mapping between the first data item and the second data item, and means for displaying the third icon.

The conversion rule deriving system further includes a conversion rule execution unit for executing a data conversion process from the first to the third table, in which the process includes the steps of: being inputted with the third conversion rule derived by the conversion rule deriving means; taking a record from the first table; applying each data item value of each taken record to the third conversion rule for calculating a value about of data item of the third table; and adding to the third record the combination of the resulting data item values as a record.

The conversion rule deriving system further includes means for displaying on the same screen the first and the second conversion rules by using the first to the third icons, fourth means for indicating the derivation of the third conversion rule into the conversion rule deriving unit by using the first and the second conversion rules, and means for displaying the third conversion rule derived by the conversion rule deriving unit by using the first to the third icons.

The conversion rule deriving system further includes a conversion rule execution unit for executing a data conversion process from the first to the third tables, in which the process includes the steps of: inputting the third conversion rule derived by the conversion rule deriving unit; taking the record from the first table; applying each data item value of each taken record into the third conversion rule for calculating a value of each data item of the third table; and adding to the third table the combination of the resulting data items as a record.

BRIEF DESCRIPTION OF THE DRAWINGS

FIG. 3 is a table showing a first example of table definition information;

FIG. 4 is a table showing a first example of data item definition information;

FIG. 5 is a table showing a first example of conversion rule information;

FIG. 6 is a table showing a first example of extraction rule information;

FIG. 7 is a table showing a first example of item conversion rule information;

FIG. 8 is a table showing an example of an organization table 1;

FIG. 9 is a table showing an example of an organization structure table;

FIG. 10 is a table showing a first example of an organization table 2;

FIG. 11 is a table showing a second example of conversion rule information;

FIG. 12 is a table showing a second example of extraction rule information;

FIG. 13 is a table showing a second example of item conversion rule information;

FIG. 14 is a flowchart illustrating a process of inputting a data definition;

FIG. 15 is a view showing an example of a table definition input screen;

FIG. 16 is a view showing an example of a data item definition input screen;

FIG. 17 is a table showing a second example of table definition information;

FIG. 18 is a table showing a second example of data item definition information;

DESCRIPTION OF THE INVENTION

Hereafter, the description will be oriented to the embodiments of the invention with reference to the appended drawings.

Figure 1:
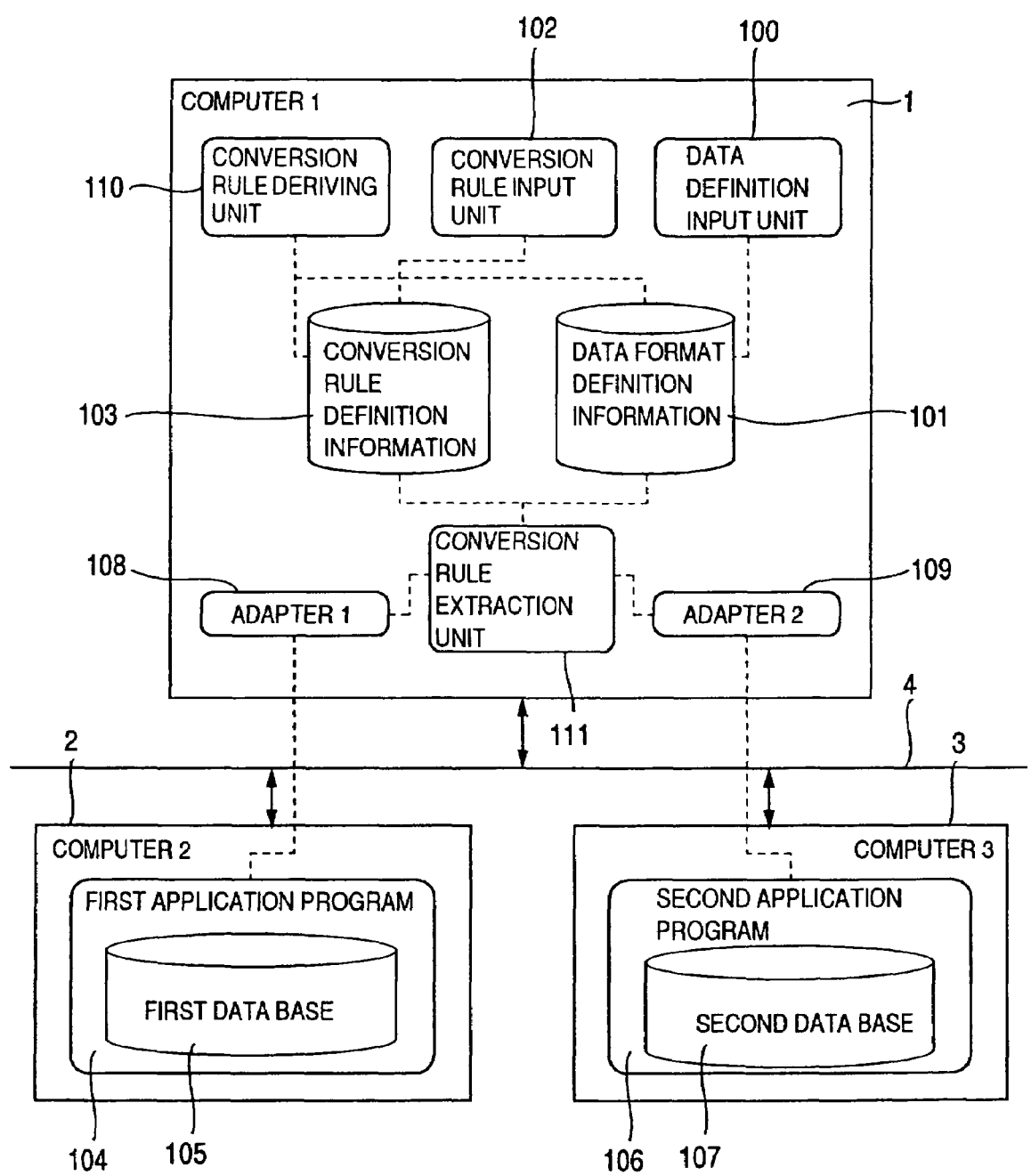
FIG. 1 is a block diagram showing an embodiment of the present invention.

FIG. 1 is a block diagram showing the embodiment in which the invention is applied to the transfer of data among different kinds of systems.

Figure 2:
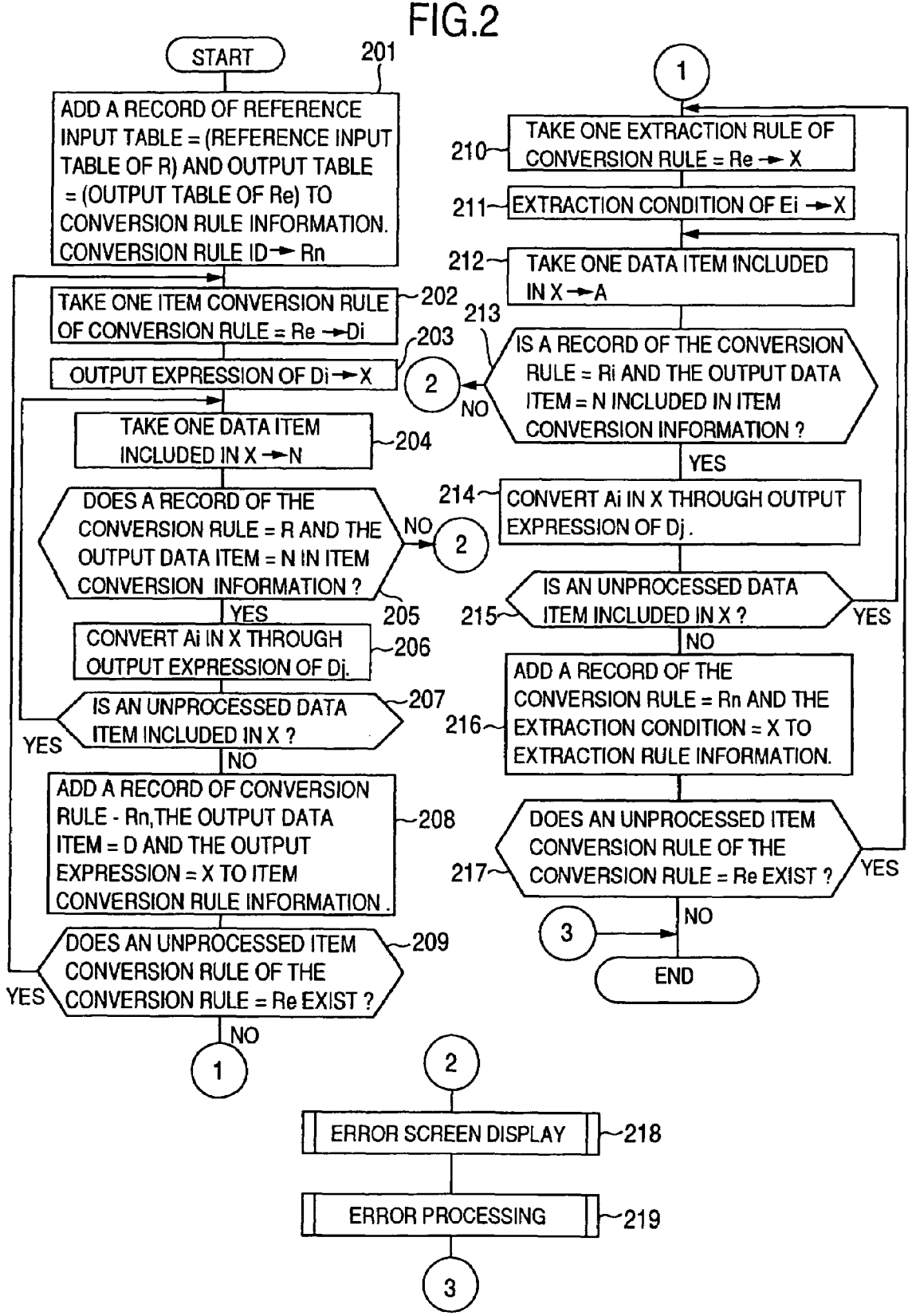
FIG. 2 is a flowchart illustrating a process of deriving a conversion rule.

In FIGS. 1, 2 and 3 denote a first computer 1, a second computer 2, and a third computer 3, respectively. Each computer includes a CPU having a sequential execution based on a program, a memory for storing the program and the data in execution, a magnetic storage unit for recording the program and the data, an I/O unit having a keyboard and a display screen, and a network adapter for inputting and outputting the data from the network.

A reference number 4 denotes a network for transferring the data among the computers 1, 2 and 3. Those computers 1, 2 and 3 are connected with the network adapter.

A reference number 100 denotes a data definition input unit that is operating in the computer 1, for prompting the programmer to input the definition of the data format.

A reference number 101 denotes data format definition information located in the computer 1 and for storing the definition of the data format inputted with the data definition input unit 100 by a programmer.

A reference number 102 denotes a conversion rule input unit for prompting the programmer to input a conversion rule for converting a certain first data format into a certain second data format.

A reference number 103 denotes conversion rule definition information for storing the conversion rule inputted through the conversion rule input unit 102 by the programmer and the conversion rule derived by a conversion rule deriving unit 110 to be discussed below. The conversion rule definition information is comprised of conversion rule information, extraction rule information, and item conversion rule information, all of which will be discussed below.

A reference number 104 denotes a first application program that is operating in the computer 2. The application program 104 includes means for being accessed from a program operating on another computer through the network.

A reference number 105 denotes a first database for storing data used by the first application program 104. The reference, update, addition and deletion of data in the first database 105 are all executed through the first application program 104.

A reference number 106 denotes a second application program operating in the computer 3. The second application program includes means for being accessed from another program operating in another computer through the network.

A reference number 107 denotes a second database for storing data to be used by the second application program. The reference, update, addition and deletion of the data in the second database 107 are all executed through the second application 106.

A reference number 108 denotes a first adapter that is operating in the computer 1 and communicates with the first application program through the network for referring to the data of the first database. The first adapter includes an interface for, if the table of the first database and the condition are specified, retrieving a record in the table, another interface for taking a data item of the retrieved record one by one, and another interface for, if the table, the condition and the data item are specified, giving back the data item value of the table.

A reference number 109 denotes a second adapter that is operating in the computer 1 and communicates with the second application program through the network for adding a new data item to the second database. The second adapter includes an interface for registering a record on the table of the second database.

A reference number 110 denotes a conversion rule deriving unit that is operating in the computer 1 and serves to derive another conversion rule by using the conversion rule defined through the conversion rule input unit 102 by the programmer.

A reference number 111 denotes a conversion rule executing unit that is operating in the computer 1 and executes conversion of the data according to the conversion rule stored in the conversion rule definition information 103.

In turn, the description will be oriented to the data used as an example in this embodiment with reference to FIGS. 3 to 10. FIGS. 3 and 4 illustrate an example of a content of the data format definition information 101.

FIG. 3 illustrates an example of table definition information in this embodiment, in which held is the mapping among a table ID 31 for uniquely identifying the table for holding the data about the conversion of the data, a table name 32 that is the name of the table, and an adapter ID 33 for communicating with the application program for managing the table and uniquely identifying the adapter for accessing the table.

FIG. 4 illustrates an example of the data item definition information in this embodiment, in which held is the mapping among a data item ID 41 for uniquely identifying a data item of the table for holding the data about the conversion of the data, a data item name 42 that is the name of the data item, a belonging table 43 that is an identifier of the table to which the data item belongs, and a key item flag 44 for setting a value 'T' if the data item is a key item in the belonging table or a value 'F' if not.

FIGS. 5 to 7 illustrate an example of a content of the conversion rule definition information 103.

FIG. 5 illustrates an example of the conversion rule information, in which held is the mapping among a conversion rule ID 51 that is an identifier for uniquely identifying a conversion rule, a conversion rule name 52 that is the name of the conversion rule, a reference input table 53 that is an identifier of the table for holding the source data before conversion in the conversion rule, and an output table 54 that is an identifier of the target table to which the conversion result is outputted along the flowchart of FIG. 2 in the conversion rule.

FIG. 6 illustrates an example of the extraction rule information, in which held is the mapping among an extraction rule ID 61 that is an identifier for uniquely identifying the condition for extracting a record to be converted, a conversion rule 62 that is an identifier of the conversion rule to which the extraction rule is applied, and an extracting condition 63 that is a condition described by using the identifier of the data item on the reference table for holding the data used for evaluating the extraction rule.

FIG. 7 illustrates an example of the item conversion rule information, in which held is the mapping among an item conversion rule ID 71 for uniquely identifying an item conversion rule for indicating an item of the output table to which the data item on the reference table or the value calculated therefrom is substituted, a conversion rule 72 that is an identifier of the conversion rule to which the item conversion rule is applied, an output data item 73 that is an identifier of the output data item, and an output expression 74 for holding a data item of the reference input table to be substituted in the output data item or an expression 74 described by using the data item of the reference input table.

FIGS. 8 to 9 illustrate a table located in the first database 105 shown in FIG. 1 and being used in the process of executing the first application program and an exemplary content of the table.

FIG. 8 illustrates a first organization table and its exemplary content, in which held is the mapping between the organization code and the organization name.

FIG. 9 illustrates an organization structure table and its exemplary content, in which held is the mapping between the organization code of a certain organization and the organization code of an upper organization to which that organization belongs.

In this embodiment, the upper two digits of the organization code of a certain organization indicates an office code to which that organization belongs.

That is, in FIG. 9, the organization in which the upper two digits of the organization code is '01' belongs to the 'Tokyo head office'. The organization in which the upper two digits of the organization code is '03' belongs to 'Yokohama branch'.

FIG. 10 illustrates the table located in the second database 107 shown in FIG. 1 and used in the executing process of the second application program, in which table held is the mapping among an organization code of a certain organization, an organization name of the organization, and an organization code of the upper organization to which that organization belongs.

The present embodiment will be described with an example of a process in which an operator takes the data about the organization belonging to the 'Yokohama branch' from the data shown in FIGS. 8 and 9 existing in the first database of FIG. 1 through the first application program and the first adapter, converts the format of the taken data into the data format of the second application program, that is, the data format thereof shown in FIG. 10, and then stores the converted data in the second database through the second application program and the second adapter.

In this process, the operator defines the intermediate data format and a first conversion rule from the data format of the first application program shown in FIGS. 8 and 9 into the intermediate data format, defines a second conversion rule from the intermediate data format into the data format of the second application program, prompts the conversion rule deriving unit located in the first computer to execute the conversion rule deriving process of FIG. 2, and thereby creates a third conversion rule from the data format of the first application program shown in FIGS. 8 and 9 into that of the second application program.

The operator operates the conversion rule executing unit to execute the third conversion rule created along the foregoing procedure so that the data shown in FIGS. 8 and 9 may be converted into the data format shown in FIG. 10 and then stored in the second database through the second application program.

Hereafter, at first, the description will be oriented to the conversion rule deriving process shown in FIG. 2 that is executed by the conversion rule deriving unit 110 by using the data shown in FIGS. 3 to 10.

Then, the description will be oriented to a data definition screen that is served as a user interface for the process of inputting the data definition as shown in FIG. 14 that is executed by the data definition inputting unit in this embodiment.

Figure 19:
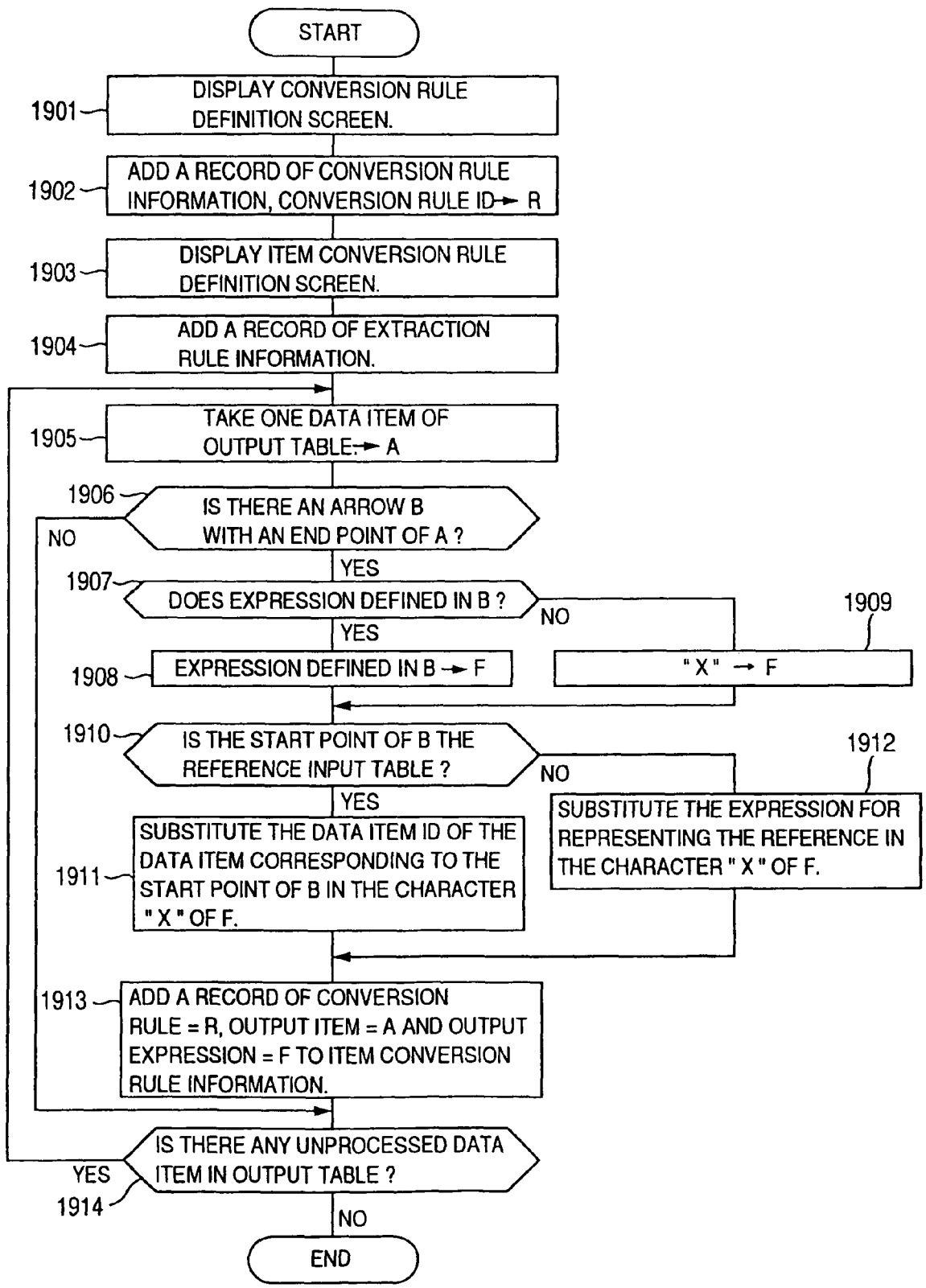
FIG. 19 is a flowchart illustrating a process of defining a conversion rule.

Next, the description will be oriented to a conversion rule definition screen that is served as a user interface for the process of defining the conversion rule as shown in FIG. 19 that is executed by the conversion rule inputting unit in this embodiment.

Next, the description will be oriented to the user interface screen of the conversion rule deriving unit.

Figures 30, 31:
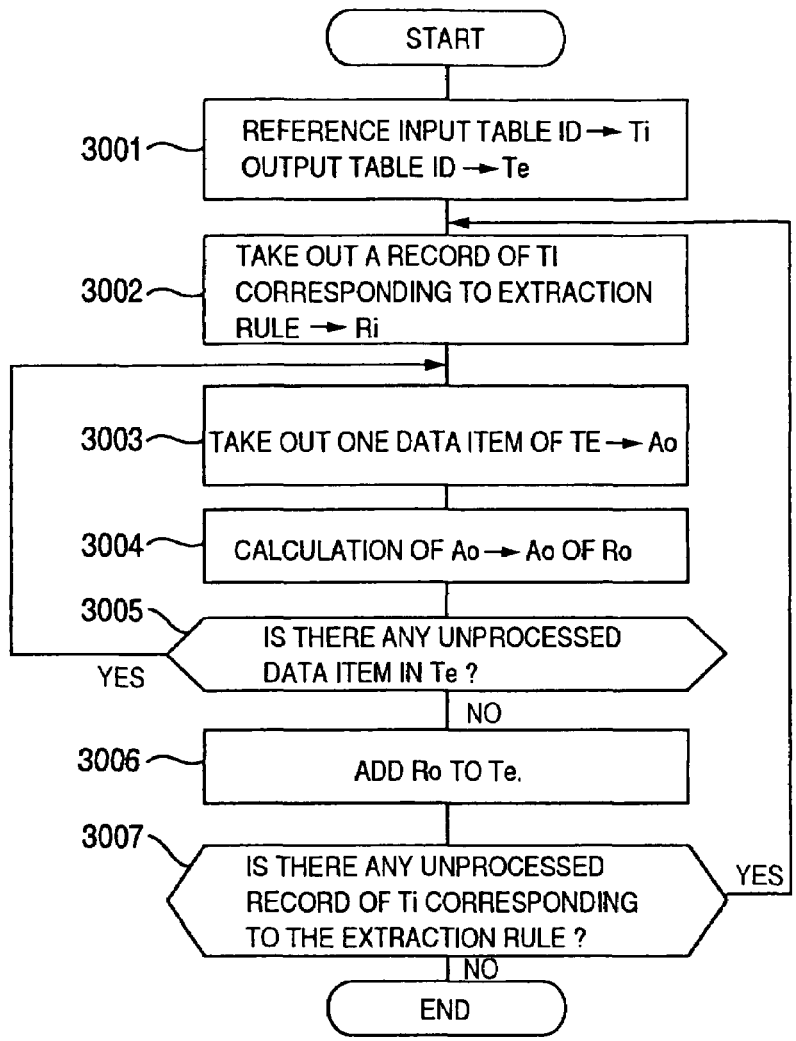
FIG. 30 is a flowchart illustrating a process of executing a conversion rule.
FIG. 31 is a table showing a second example of an organization table 2.

Finally, the description will be oriented to the process of executing the conversion rule shown in FIG. 30 in which process the conversion rule executing unit executes the data conversion process by using the conversion rule indicated in this embodiment.

At first, with the example of the data shown in FIGS. 3 to 7, the conversion rule deriving process shown by the flowchart of FIG. 2 will be described below.

In the process shown in the flowchart of FIG. 2, when the process is started by specifying the conversion rule Ri from the data of the table that corresponds to an input of the conversion to the intermediate data and the conversion rule Re from the intermediate data into the data that corresponds to an output of the conversion, the conversion rule Rn is derived in which rule the data of the table that corresponds to the input of Ri is directly converted into the data of the table that corresponds to the output of Re without passing through the intermediate data.

Herein, the following description will be expanded on the assumption that the operator specifies as the conversion rule Ri a record whose conversion ID is 'R001' in FIG. 5 and as the conversion rule Re a record whose conversion ID is 'R002' in FIG. 5.

In this example, the process shown in FIG. 2 is executed to derive a third conversion rule that corresponds to a combination of a first conversion rule whose conversion rule ID is 'R001' and a second conversion rule whose conversion rule is 'R002'.

At first, in step 201, a new record is added to the conversion rule information shown in FIG. 5, in which record the reference input table is for Ri and the output table is for Re. Herein, since Ri is 'R001', it is understood from FIG. 5 that the reference input table of the record whose conversion rule ID is 'R001' is 'T001' and thus the reference input table of Ri is 'T001'. Further, since Re is 'R002', it is understood from FIG. 5 that the output table of the record whose conversion rule ID is 'R002' is 'T004' and thus the output table of Re is 'T004'. Hence, the record having the reference input table of 'T001' and the output table of 'T004' is added to the conversion rule information shown in FIG. 5. In this addition, the added record has a unique conversion rule ID that does not overlap with another conversion rule and then is stored in Rn.

Herein, the description will be expanded on that the conversion rule ID of 'R003' is added to the record to be added.

Also, the conversion rule name is set to have an empty character string.

An example of the record to be inserted to the conversion rule information of FIG. 5 by the process of step 201 is shown in FIG. 11.

In the loop of steps 202 to 209, the process in the loop is executed about each record having the conversion rule 72 equal to the conversion rule ID of Re in the item conversion rule information shown in FIG. 7.

At first, in step 202, one record having the conversion rule 72 equal to the conversion rule ID of Re in the item conversion rule information of FIG. 7 is taken out and the item conversion rule ID of the record is stored in a variable Di.

Herein, since Re is 'R002', it is understood that the concerned records have the item conversion rule IDs of 'D005', 'D006' and 'D007'.

Later, the process of the steps 203 to 208 will be described in the case that the item conversion rule ID 'D005' is stored in the variable Di.

In step 203, a character string stored in the output expression of the record whose item conversion rule ID is Di is stored in the variable X.

Herein, since it is understood from FIG. 7 that the output expression of the record whose conversion rule ID is 'D005' is 'A005', the character string 'A005' is substituted in X.

In the loop of steps 204 to 207, the process in the loop is repeated about each data item ID appearing in the character string of X, that is, the output expression of Di.

At first, in step 204, one data item ID appearing in the character string of X, that is, the output expression of Di is taken out and then is stored in a variable Ai. In the illustrated example, 'A005' indicates the data item ID in the character string stored in X. Hence, 'A005' is stored in the variable Ai.

In step 205, it is checked if there exists a record whose conversion rule is equal to Ri and output item is equal to Ai in the item conversion rule information of FIG. 7. If any, the item conversion rule ID of the record is stored in Dj, and then process after step 206 is executed. If not, the process after step 218 (to be discussed below) will be executed.

In the illustrated example, the value of Ri is 'R001' and the value of Ai is 'A005'. In the item conversion rule information shown in FIG. 7, the record whose conversion rule is 'R001' and output item is 'A005' has the item conversion rule ID of 'D001'. Hence, 'D001' is stored in Dj.

Then, in step 206, Ai, that is, the data item ID included in the character string that is the value of X is replaced with the output expression of Dj.

In the illustrated example, X is 'A005' and Ai is 'A005'. In the item conversion rule information shown in FIG. 7, the output expression of the record whose item conversion rule ID is Dj, that is, 'D001' is 'A001'. Hence, the character string 'A005' in X is replaced with 'A001'. Therefore, the value of X is made to be 'A001'.

The step 207 is located at the end of the loop started in the step 204. In the step 207, therefore, if two or more data item IDs are included in the character string stored in X, the process from the steps 204 to 206 is repeated about all the data item IDs included in the character string stored in X.

In the illustrated example, the value of X is given 'A005' before the character string is replaced in the step 206 and includes only one data item ID. It means that processed are all the data items IDs included in the character string stored in X. Hence, the process goes to the step 208.

In step 208, a record whose conversion rule is Rn, output item is that of Di, and output expression is X is added to the item conversion rule information shown in FIG. 7. At a time, the item conversion rule ID is set to have a unique value that is not overlapped with that of another record.

In the illustrated example, the record whose Rn is 'R003' and item conversion rule ID is Di, that is, 'D005' in the item conversion rule information has an output item of 'A009' and X of 'A001'. Hence, the record whose conversion rule is 'R003', output item is 'A009', and output expression is 'A001' is added to the item conversion rule information shown in FIG. 7.

The step 209 is the end of the loop started in the step 202. The process from the steps 202 to 208 is repeated about the item conversion rule Di equal to the conversion rule ID of the conversion rule Re in the item conversion rule information shown in FIG. 7.

In the illustrated example, as set forth in the description about the step 202, the number of the record whose conversion rule is Re is three. The remaining two records, that is, the records whose item conversion rule IDs are 'D006' and 'D007' in the item conversion rule information shown in FIG. 7 are subject to the process from the steps 202 to 208.

FIG. 13 shows the record of the item conversion rule information to be added. In FIG. 13, the record whose item conversion rule ID is 'D008' is to be added to the item conversion rule information in the step 208 if 'D005' is stored in Di in the step 202. The record whose item conversion rule ID is 'D009' is to be added to the item conversion rule information in the step 208 if 'D006' is stored in Di in the step 202. The record whose item conversion rule ID is 'D010' is to be added to the item conversion rule information in the step 208 if 'D007' is stored in Di.

Herein, in the output expression of the record whose item conversion rule ID shown in FIG. 13 is 'D0101', 'getRef' is a function of referring to the value of the record of the table except the reference input table in executing the conversion. This function works as follows. By specifying the data item ID that is a returned value of the function to a first parameter, the table ID to be referred to as a second parameter, and a condition for uniquely identifying a record in the table indicated by the second parameter to a third parameter, the function is executed to return the value of the data item indicated by the first parameter of the record in the table of the second parameter uniquely identified by the condition indicated by the third parameter.

In other words, the function "getRef ('A004', 'T002', 'A003==A001')" represents the output expression that is executed to uniquely identify the record from the table indicated in the table ID 'T002' on the condition indicated by the expression 'A003==A001' and return the value of the data item indicated by the data item ID 'A001' in the identified record.

The process of steps 210 to 217 is similar to the process of the steps 202 to 209 and is subject to the record of the extraction rule information shown in FIG. 6.

That is, in the loop of the steps 210 to 217, the process in the loop is executed about each record of the extraction rule information equal to the conversion rule ID of the conversion rule Re in the extraction rule information shown in FIG. 6.

At first, in step 210, one record whose conversion rule is equal to Re in the extraction rule information shown in FIG. 6 and then the extraction rule ID is stored in a variable Ei.

In the illustrated example, Re is 'R002'. Hence, the record whose extraction rule ID is 'E001' is the concerned one. This is a sole record in FIG. 6. Thus, the item conversion rule ID of this record is stored in Ei.

In step 211, the character string stored in the extraction of Ei is stored in the variable X.

In the illustrated example, the extraction of the record whose extraction rule ID is Ei, that is, "E001" in the extraction rule information is "A008=='03'". This character string is stored in X.

In the loop of steps 212 to 215, the process in the loop is executed about each data item ID appearing in X, that is, the character string of the extraction of Ei.

At first, in step 212, one data item ID appearing in the character string stored in X is taken out and then is stored in the variable Ai.

In the illustrated example, the character string stored in X is "A008=='03'" and 'A008' in this character string represents the data item ID. Hence, 'A008' is stored in the variable Ai.

In step 213, it is checked if there exists a record whose conversion rule is equal to Ri and output item is equal to Ai. If any, the item conversion rule ID of the record is stored in Dj and then the process after step 214 is executed. If not, the process after step 218 is executed.

In the illustrated example, the value of Ri is 'R001', the value of Ai is 'A008', and the item conversion rule ID of the record whose conversion rule ID is 'R001' and output item is 'A008' in the item conversion rule information of FIG. 7 is 'D004'. Hence, 'D004' is stored in Dj.

Then, in the step 214, Ai, that is, the data item ID included in the character string that is the value of X is replaced with the output expression of Dj.

In the illustrated example, X is "A008=='03'", Aj is 'A008', and the output expression of the record whose item conversion rule ID is Dj, that is, 'D004' in the item conversion rule information of FIG. 7 is 'StrChop (0, 2, "A001")'. Hence, the character string 'A008' in X is replaced with 'StrChop (0, 2, "A001")'.

As a result, the value of X is made to be the character string 'StrChop (0, 2, "A001")=='03'".

Herein, "StrChop" is the predefined expression, which is executed to return a partial character string created by taking the character number indicated by the second parameter from the position of the first parameter counted from the character string specified by the third parameter with 0 position as the head of the character string.

The step 215 is the end of the loop started in the step 212. The process of the step 215 is executed to repeat the process from the steps 212 to 214 about all the data item IDs included in the character string stored in X if two or more data item IDs are included in the character string stored in X.

In the illustrated example, the value of X before replacing the character string in the step 206 is "A008=='03'". Hence, the value of X includes only one data item ID. It means that all the data item IDs of the character string stored in X are processed. Thus, the process goes to the step 216.

In step 216, the record whose conversion rule is Rn and extraction is X is added to the extraction rule information shown in FIG. 6.

At this time, the conversion rule ID is set to have a unique value that is not overlapped with that of another record.

In the illustrated example, since Rn is 'R003' and X is 'StrChop (0, 2, "A001")=='03'", the record whose conversion rule is 'R003' and extraction is 'StrChop (0, 2, "A001") =='03'" is added to the extraction rule information shown in FIG. 6.

The step 217 is the end of the loop started in the step 210. The process of the step 217 is executed to repeat the process of the steps 210 to 216 about the item conversion rule Ei equal to the conversion rule ID of the conversion rule Re in the extraction rule information of FIG. 6.

In the illustrated example, as set forth above in the description about the step 210, just one record has the conversion rule of Re, that is, it is the record whose extraction rule ID is 'E001'. The process has been terminated. It means no unprocessed record whose conversion rule is Re is left. Hence, the process is finished.

An example of the record of the extraction rule information to be added as a result of the process of the steps 210 to 217 is shown in FIG. 12.

On the other hand, in the steps 205 and 213 of FIG. 2, if no record has the conversion rule equal to Ri and output item equal to Ai in the item conversion rule information 80 in FIG. 7, the process of the steps 218 and 219 is executed.

In the step 218, the process is executed to notify the operator of the fact that the conversion rule between the input data and the intermediate data is not positively defined by displaying an error screen. In addition to the method of displaying an error, another method may be taken of writing the record in the file or the table having recorded an error.

In step 219, by deleting the record created in the foregoing process of FIG. 2, that is, the record whose conversion rule is equal to Rn in the item conversion rule information and the record whose conversion rule ID is equal to Rn in the conversion rule information, the state is returned to that before the conversion rule deriving process shown in FIG. 2.

Then, the data definition input process of defining a data format and a intermediate data format of the first application program and the second application program is shown in the flowchart of FIG. 14, the screens of FIGS. 15 and 16, the second table definition information of FIG. 17, and the second data item definition information of FIG. 18.

In FIG. 14, in step 1401, the process is executed to display a screen showing a table defined by an operator.

The screen displayed in this process is shown in FIG. 15.

A reference number 1501 denotes a field to which the operator inputs a character string for indicating the name of the table to be defined by the operator himself.

A reference number 1502 denotes a field to which inputted is a character string for indicating an adapter ID for uniquely identifying an adapter for communicating with the application program held in the table.

If nothing is inputted by the operator at the field 1502, it means that the table defined by the operator is the intermediate data.

Herein, the description will be expanded on the case that "organization table 3" is inputted to the field 1501 and nothing is inputted to the field 1502, that is, the operator defines the intermediate data format called "organization".

When the operator inputs that data and presses a completion button 1503 with an input device such as a mouse, the process of the step 1402 in FIG. 14 is executed.

In the step 1402, the process is executed to add to the table definition information shown in FIG. 17 the record having the character string inputted to the field 1501 by the operator as its table name and the adapter ID inputted to the field 1502 by the operator as its adapter ID.

At this time, the table ID of the table definition information is set to have a unique value that is not overlapped with the table ID of the record that is pre-recorded in the table definition information and then the unique value is stored in a variable T.

In the illustrated example, if "T003" is inputted as the table ID, the record whose table ID is "T003", table name is "organization table 3", and adapter ID is empty is added to the table definition information shown in FIG. 17. The result is made to be the table definition information shown in FIG. 13.

Then, in step 1403 shown in FIG. 14, the process is executed to display the screen on which the data item of the table defined on the screen of FIG. 15 by the operator is to be defined.

FIG. 16 shows an exemplary screen displayed in the step 1403. In FIG. 16, a reference number 1601 denotes a list of input fields for prompting an operator to input a character string representing a data item name. The operator is prompted to input a data item name to each field on one column of the table.

A reference number 1602 denotes a check box for checking if each data item is a key item in the table defined on the screen shown in FIG. 15. If the data item on each row is a key item, the operator gives a check to the data item.

On the screen of FIG. 16, the table whose name is "organization table 3" has the data item names of "organization code", "organization name" and "upper organization code" and the "organization code" defined as the key item by the operator.

In FIG. 16, when the operator presses a completion button 1603 with an input device such as a mouse, the process of the step 1404 in FIG. 14 is executed.

In step 1404, a new record is added to the data item definition information shown in FIG. 18, in which new record if the operator checks the check box for representing that the data item name is defined in FIG. 16, the belonging table is T, and the key is a key value in FIG. 16 about all the data items defined by the operator in FIG. 16, a value of "T" is given and if not, a value of "F" is given.

At this time, the data item ID of the data item definition information is set to have a unique value that is not overlapped with the data item ID of the record pre-registered in the data item definition information.

In the illustrated example, about each record in which the data item name is "organization code", "organization" and "upper organization code", those data item names are given "A005", "A006", "A007" and "A008" as the data item IDs. Then, the record is added to the data item definition information shown in FIG. 18. The result is made to be the data item definition information shown in FIG. 14.

Like the illustrated example, the operator can input the table definition information about the table included in the first and the second application programs.

Further, the first and the second adapter may provide means for referring to the information on the format of the table included in each application program as their interfaces. The use of this referring means makes it possible to automatically create the table definition information of the first and the second application programs.

Moreover, the present embodiment has concerned with the method for inputting each data item and only a specification as to whether or not each data item is a key item. In addition, for example, an area for storing information such as a byte number of each data item and a type of each data item may be secured in the data item definition information. Then, these kinds of data may be inputted by the operator or obtained by each application program through the adapter.

In turn, the description will be oriented to the process and the screen of the conversion rule defining unit with reference to FIGS. 19 to 26.

FIG. 19 is a flowchart showing an example of a process for defining a conversion rule executed by the conversion rule defining unit. In step 1901, the process is executed to display the conversion rule defining screen shown in FIG. 20.

Figure 20:
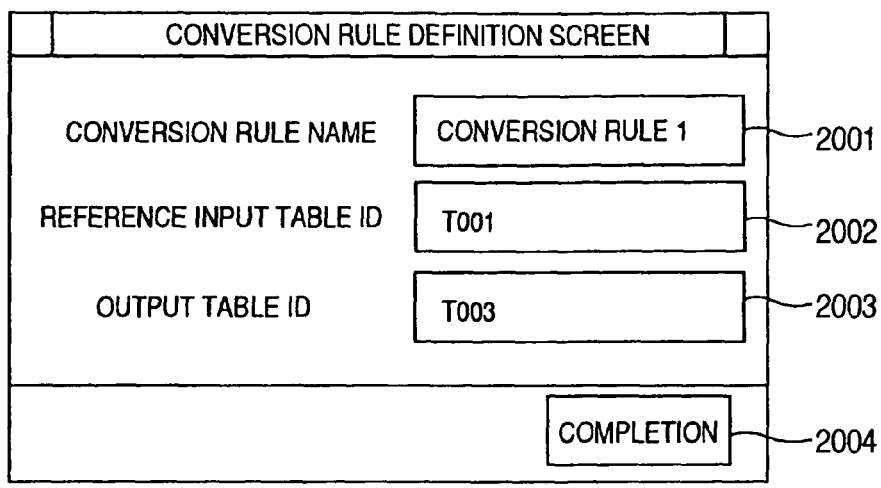
FIG. 20 is a view showing an example of a conversion rule definition screen.

In FIG. 20, a reference number 1901 denotes a field to which the character string for indicating the name of the conversion rule defined by the operator is inputted.

Herein, the case that the operator inputs the character string of "conversion rule 1" will be described.

A reference number 2002 denotes a field to which character string for indicating the ID of the reference input table is inputted.

Herein, the case that the operator inputs the character string of "T001" will be described.

A reference number 2003 denotes a field to which character string for indicating the ID of the output table is inputted.

Herein, the case that the operator inputs the character string of "T003" will be described.

In this embodiment, 2002 and 2003 denote the input fields of the character string. In order to make the operativity better, for example, a user interface may be created in which a table pre-defined in the table definition information is displayed as a list so that the operator may select an item on the list.

On the screen of FIG. 20, when the operator depresses a completion button 2004 with an input device such as a button, the conversion rule defining unit operates to execute the process after the step 1902 in FIG. 19.

In step 1902, a new record is added to the conversion rule information, in which record the conversion rule name is inputted on the screen of FIG. 20 by the operator, the reference input table has the reference input table ID inputted on the screen of FIG. 20 by the operator, and the output table has the output table ID inputted on the screen of FIG. 20 by the operator in the conversion rule information (see FIG. 5).

At this time, the conversion rule ID is set to have a unique value that is not overlapped with the conversion rule ID of the record pre-registered in the conversion rule information.

Herein, the record in which the conversion rule name is the "conversion rule 1", the reference input table ID is "T001", and the output table ID is "T003" is added to the conversion rule information. The case that the conversion rule ID given at this time was "R001" will be described below.

Figure 21:
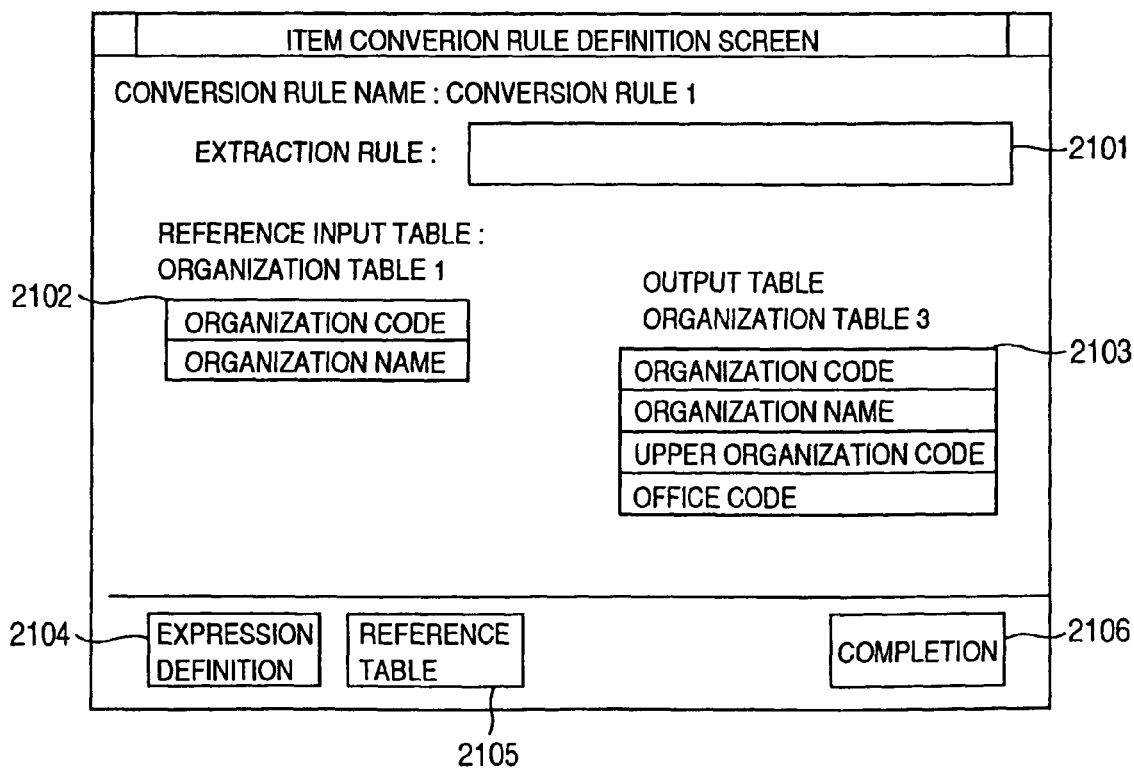
FIG. 21 is a view showing a first example of an item conversion rule definition screen.

In step 1903, the process is executed to display the screen for defining the item conversion rule shown in FIG. 21.

In FIG. 21, a reference number 2101 denotes a field to which the extraction rule about the conversion rule defined on the screen of FIG. 21 is inputted as a character string.

A reference number 2102 denotes a field for displaying the data items of the reference input table specified on the screen of FIG. 20. On the field is displayed as a list the data items of the record having the belonging table equal to the reference input table ID specified on the screen of FIG. 20, extracted from the data item definition information (see FIG. 4).

A reference number 2103 shows the data items of the output table specified on the screen of FIG. 20. The data item names of the record having the belonging table equal to the output table ID specified on the screen of FIG. 20, extracted from the data item definition information, are displayed as a list.

On the screen for defining the item conversion rule, a user interface is prepared for prompting the operator to map the data item of the reference input table with the data item of the output table.

For example, the user interface may be arranged to prompt the operator to specify the data item of the reference input table and the data item of the output table with an input device such as a mouse so that the data item of the reference input table is mapped to the data item of the output table.

Figure 22:
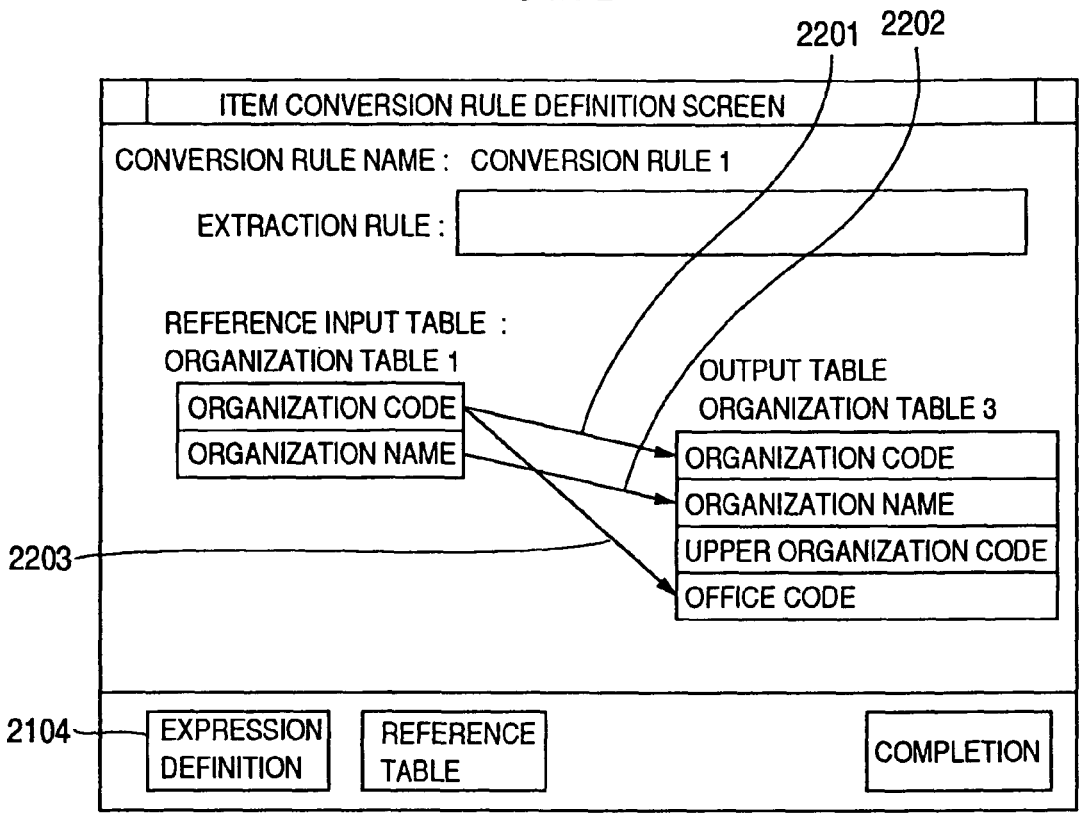
FIG. 22 is a view showing a second example of an item conversion rule definition screen.

FIG. 22 shows this mapping indicated by arrows 2201 to 2203. In the example shown in FIG. 22, the data items of the output table "organization code", "organization name", and "office code" are defined by the operator in a manner to map them to the data items of the reference input table "organization code", "organization name", and "organization code".

Further, on the screen for defining the item conversion rule, for mapping between the defined data items, a user interface is prepared for inputting an expression for calculating the value of a data item to be outputted, that is, the value of the data item that is an end of an arrow indicated by FIG. 22 by using the data item to be inputted, that is, the data item that is a start point of an arrow indicated by FIG. 22.

In FIG. 22, the operator selects the arrow indicated by 2203 with an input device such as a mouse and then depresses an expression definition button indicated by 2104 with an input device such as a mouse. Then, the expression definition screen indicated by 2301 of FIG. 23 appears.

A reference number 2302 denotes an input field to which a character string for representing the expression of the output data is inputted.

The operator describes the expression for calculating the value of the data item of the output table specified from the value of the data item of the specified reference input table by using the variable X in place of the data item of the input table.

Figure 23:
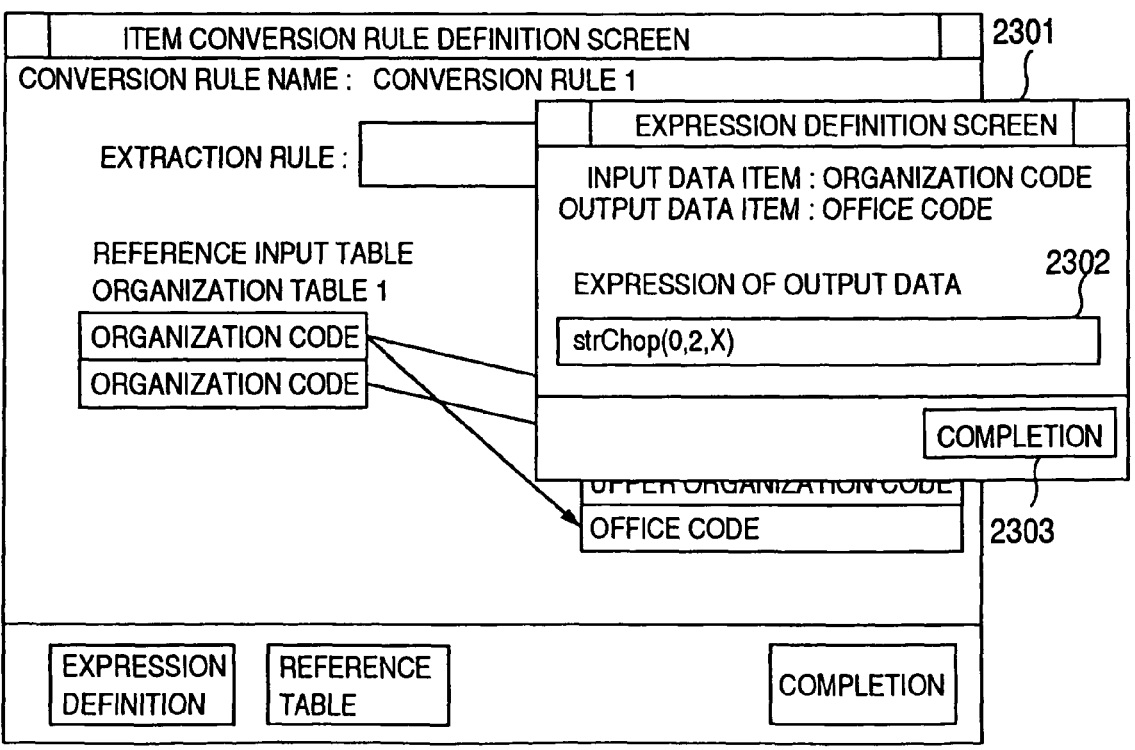
FIG. 23 is a view showing an example of an expression definition screen.

A reference number 2302 of FIG. 23 indicates an example in which the character string of "strchop (0, 2, X)" is inputted as the expression of the output data by the operator.

As set forth above, "strchop" is the predefined expression, which is executed to return a partial character string created by taking the character number indicated by the second parameter out of the first parameter position counted on the character string specified by the third parameter with 0 position as the head of its character string.

For example, if the value of X is the character string "032002", "strchop (0, 2, X)" is executed to give back the character string "03".

When the completion button is depressed in the state shown in FIG. 23, the expression defining screen is finished, and the defined expression is stored with the mapping between the data items.

Further, the item conversion rule defining screen is required for obtaining the value of the data item of the output table. A user interface is prepared for prompting the operator to input the ID of the reference table except the reference input table. The reference table inputted by the operator is displayed on the item conversion rule defining screen.

Figure 24:
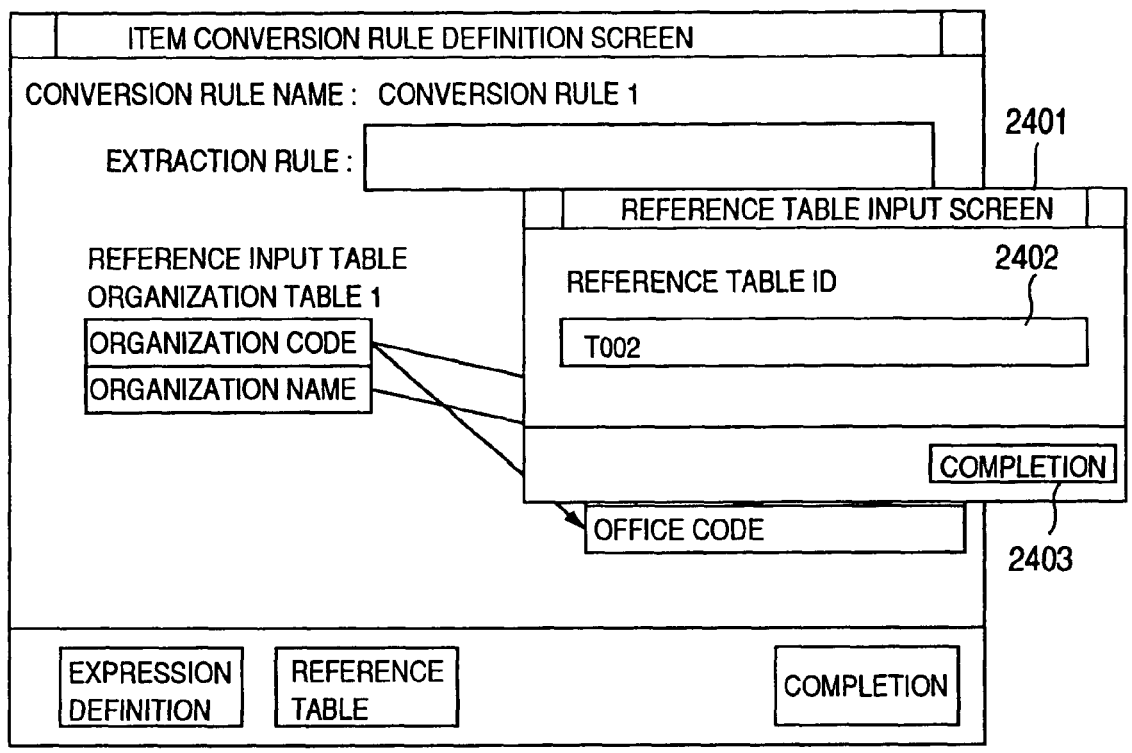
FIG. 24 is a view showing an example of a reference table input screen.

In FIG. 22, when the operator depresses a reference table button 2105, the reference table input screen 2401 shown in FIG. 24 is displayed on the reference table input screen 2401.

In FIG. 24, a reference number 2402 denotes an input field to which the operator inputs the ID of the reference table as a character string.

FIG. 24 shows an example in which the operator inputs "T002" as the reference table ID.

In this embodiment, a reference number 2402 denotes an input field of the character string. In order to make the operativity more excellent, for example, a user interface may be prepared for displaying as a list the tables pre-defined in the table definition information and prompting the operator to select one of the tables.

When the operator depresses a completion button 2403 of FIG. 24 with the input device such as a mouse, the reference table input screen indicated by 2401 is terminated and then the item conversion rule defining screen displays the data items of the reference table.

That is, the process is executed to extract from the data item definition information a record having a belonging table whose ID is equal to the reference table ID specified on the screen of FIG. 24 and then to display the data item names of the record as a list.

Figure 25:
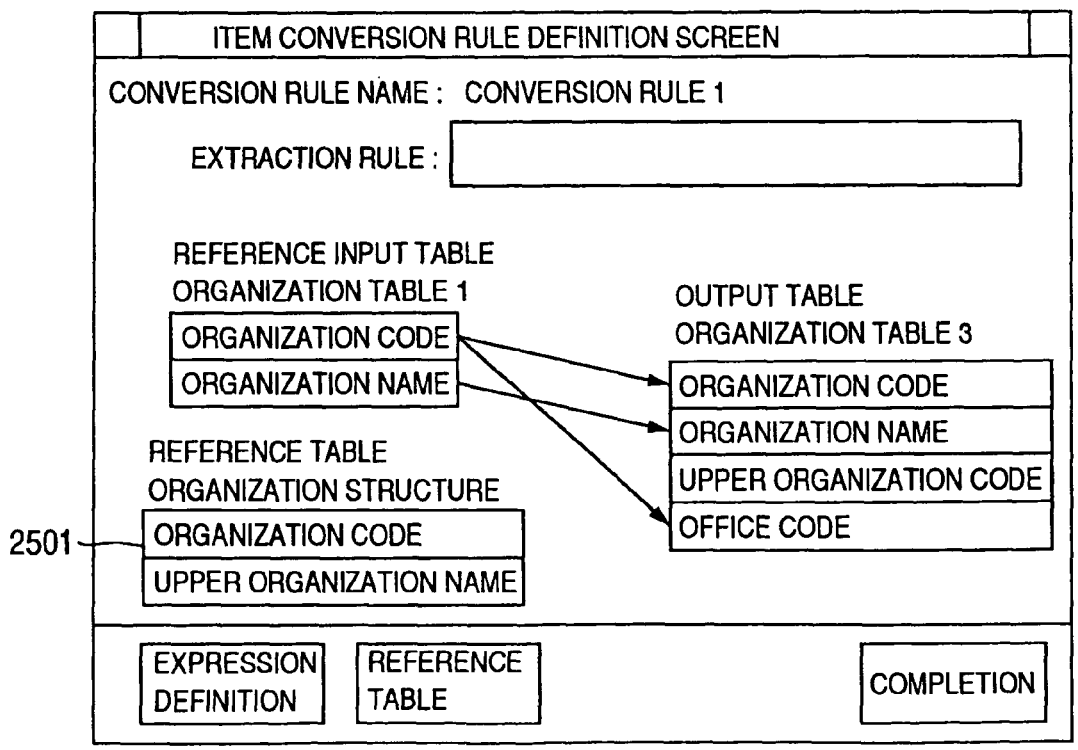
FIG. 25 is a view showing a third example of an item conversion rule definition screen.

FIG. 25 shows the item conversion rule defining screen appearing when the operator depresses the completion button 2403 in FIG. 24. A reference number 2501 denotes the list of the data items of the "organization structure table" whose table ID is "T002".

On the item conversion rule defining screen, a user interface is prepared for mapping the data item of the reference input table to the data item of the reference table indicated by 2501 of FIG. 25.

That is, this mapping defines the rule for uniquely defining the record of the reference table by using the value of a certain data item included in the record if the record of the reference input table is uniquely defined.

This mapping is accomplished on the selection of the data item of the reference input table and the data item of the reference table by the operator with the input device such as a mouse.

Figure 26:
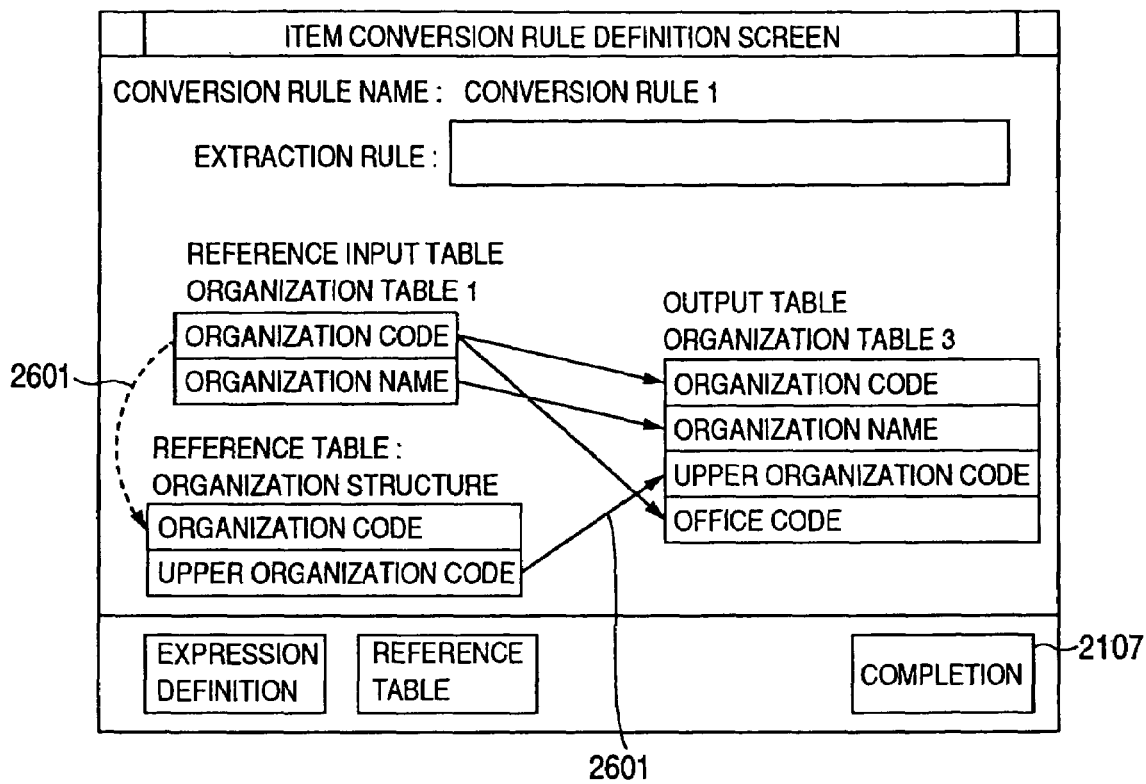
FIG. 26 is a view showing a fourth example of an item conversion rule definition screen.

In FIG. 26, the arrow of a broken line indicated by 2601 shows the mapping of the data item of the reference input table with the data item of the reference table.

In the example of FIG. 26, the process is executed to take out a record of the reference table having an organization code equal to the organization code of the reference input table and calculate the value of the data item of the output table with the value of the data item of the record.

About the mapping of the data item of this reference input table with the data item of the reference table, the expression may be defined as shown in FIG. 23. The data item of the output may be calculated by using the record in which the value derived by applying the expression defined by the operator to the value of the data item of the reference input table that is the start of the mapping defined by the operator is equal to the value of the data item of the reference table that is the end of the mapping defined by the operator.

Further, the mapping between the data item of the reference table and the data item of the output table may be defined like 2201, 2202 and 2203 of FIG. 22.

A reference number 2601 of FIG. 26 indicates the screen on which the value of the upper organization code of the reference table is substituted in the upper organization code of the output table.

On the screen shown in FIG. 26, when the operator depresses a completion button 2106 with an input device such as a mouse, the conversion rule defining unit operates to execute the process after the step 1904 of FIG. 19.

In the step 1904, if the operator defines the extraction rule on the screen shown in FIG. 21, a new record having R as its conversion rule and an extraction rule defined by the operator as its extraction rule is added to the extraction rule information (see FIG. 6).

At this time, the extraction rule ID is set to have a unique extraction rule ID that is not overlapped with the extraction rule ID of the record included in the extraction rule information.

In the examples shown in FIGS. 21 to 26, the operator does not define the extraction rule. Hence, the process of the step 1904 executes nothing.

Then, the process from the steps 1905 to 1914 is repeated about the data item A of the output table.

In the step 1906, it is checked if the arrow with A as its end is defined on the screen, that is, the mapping B of the reference input table or the reference table to the data item A of the output table is defined.

If not defined, the process is shifted to the end of repetition in the step 1914, and then the subsequent repetition is executed.

If defined, the process in the step 1907 is executed.

In the step 1907, it is checked if the expression is defined for the mapping B.

If the expression is defined, the character string of the expression is stored in a variable F (1908). If not defined, the character string "X" is stored in F (1909).

In step 1910, it is checked if the data item that is the start of B corresponds to the data item of the reference input table or the data item of the reference table. If it is the data item of the reference input table, the process of the step 1911 is executed, while if it is the data item of the reference table, the process in step 1912 is executed.

In the step 1911, the portion of "X" in the character string F is replaced with the ID of the data item of the reference input table or the reference table that is the start of the mapping B.

In the step 1912, the portion of "X" in the character string F is replaced with the character string representing the expression equivalent to "getRef ($\alpha$, $\beta$, $\gamma$) assuming that an evaluation expressed as "$\gamma=\zeta(\epsilon)$" in which the ID of the data item that is the start of the mapping B is $\alpha$, the ID of the table to which the data item that is the start of the mapping B belongs is $\beta$, the data item ID of the reference input table mapped with the reference table and the reference input table that is the start of the mapping B is $\delta$, the data item ID of the reference table is $\epsilon$, and the function for indicating the expression defined in the mapping is $\zeta$.

Herein, "getRef" is a function prepared as the interface of the first adapter shown in FIG. 1. If the first parameter is given a data item ID, the second parameter is given a table ID, and the third parameter is given a condition for uniquely identifying a record from the records included in the table indicated by the second parameter, this function is executed to take out the record that coincides with the condition specified by the third parameter from the table specified by the second parameter and give back the value of the data item given by the first parameter of the taken record.

In step 1913, the record having a conversion rule of R, an output item of A, and an output expression of F is added to the item conversion rule information (see FIG. 7). At this time, the item conversion ID is set to have a unique value that is not overlapped with the item conversion rule ID of the record pre-registered in the item conversion rule information.

The step 1914 is the end of the repetition started from the step 1905, and the process of the steps 1906 to 1913 is repeated about all the data items of the output table.

The foregoing process is executed to create the record 55 in FIG. 5 and the records 75, 75, 77 in FIG. 7 from the content defined by the operator on the screens shown in FIGS. 20 to 26.

Figure 27:
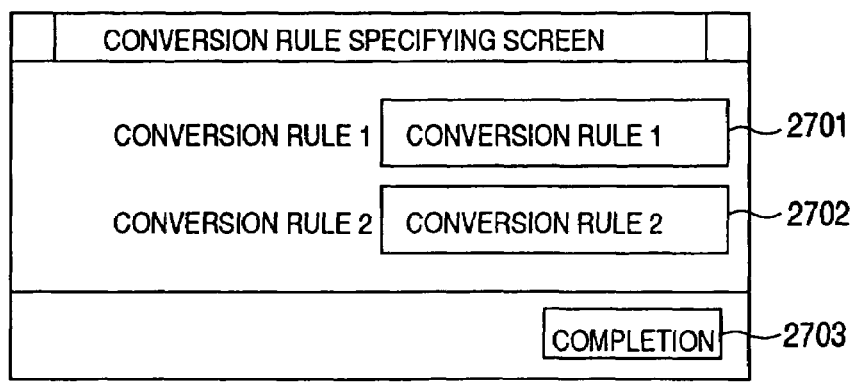
FIG. 27 is a view showing an example of a conversion rule specification screen.
Figure 28:
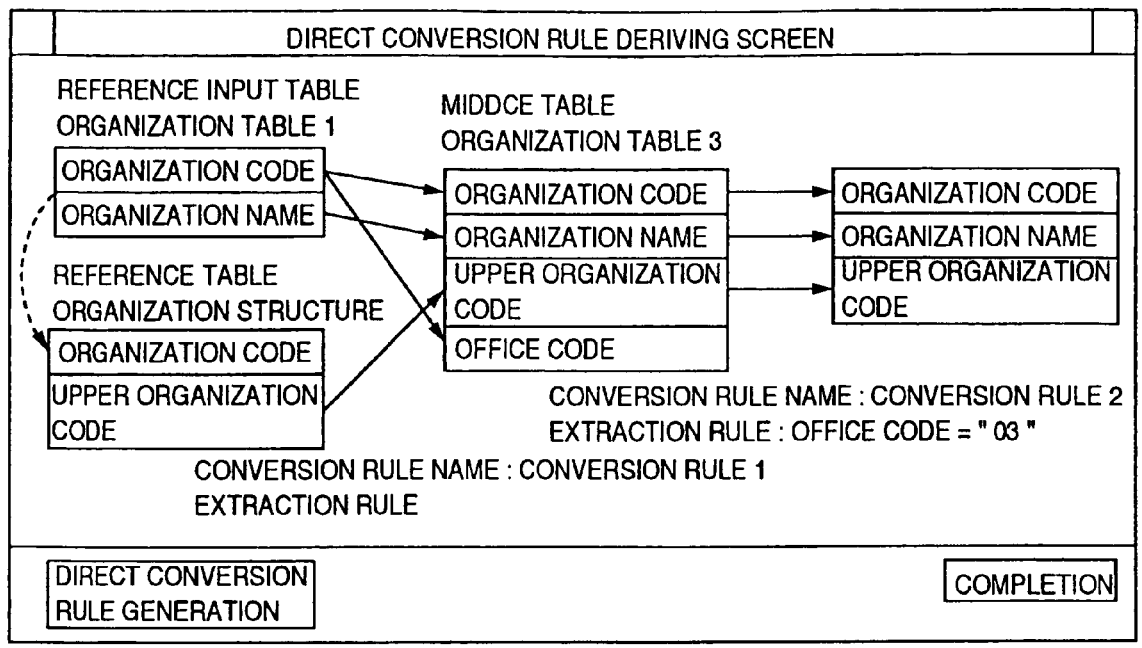
FIG. 28 is a view showing a first example of a direct conversion rule derivation screen.
Figure 29:
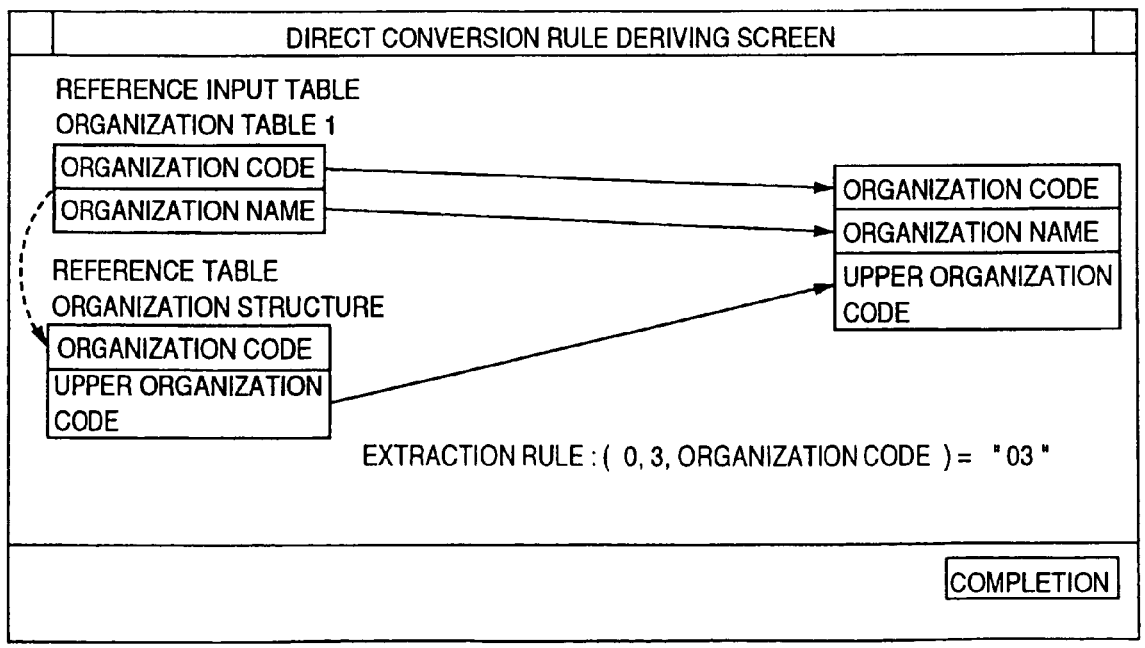
FIG. 29 is a view showing a second example of a direct conversion rule derivation screen.

In turn, the description will be oriented to an example of a user interface for executing the conversion rule deriving process shown in FIG. 2 through the screens shown in FIGS. 27 to 29.

FIG. 27 shows an example of a screen for specifying a conversion rule underlying the conversion rule derivation.

A reference number 2701 denotes an input field to which the character string for indicating the conversion rule 1 is inputted. This conversion rule 1 underlies the conversion rule to be derived. A reference number 2702 denotes an input field to which the character string for indicating the conversion rule 2 is inputted. This conversion rule 2 underlies the conversion rule to be derived.

FIG. 27 indicates the screen where the operator specifies the character strings of "conversion rule 1" and "conversion rule 2" to the fields 2701 and 2702.

In this embodiment, the reference numbers 2701 and 2702 denote the input fields for the character strings. In order to make the operativity more excellent, for example, a user interface is prepared to display the conversion rules predefined in the conversion rule information as a list and prompting the operator to select one of those conversion rules.

In FIG. 27, when the operator depresses a completion button 2703 with an input device such as a mouse, the screen shown in FIG. 28 is displayed.

FIG. 28 shows one screen on which the conversion rules 1 and 2 defined by the operator appear. From the conversion rule information, the table definition information, the data item definition information, the extraction rule information and the item conversion rule information are grasped the data item of the reference input table in the conversion rule 1, the data item of the output table in the conversion rule 1, that is, the reference input table in the conversion rule 2, the data item of the reference input table in the conversion rule 1, the extraction rule in the conversion rule 1, the mapping of the data item of the reference input table in the conversion rule 1 with the data item of the output table, the mapping of the data item of the reference input table in the conversion rule 1 to the data item of the reference table, the data item of the output table in the conversion rule 2, the data item of the reference data item in the conversion rule 2, the mapping of the data item of the reference input table in the conversion rule 2 to the data item of the output table, and the mapping of the data item of the reference input table in the conversion rule 2 with the data item of the reference table, which are displayed on the screen in the relevant figures.

In FIG. 28, when the operator depresses a button 2801 for creating a direct conversion rule with an input device such as a mouse, the process for deriving a conversion rule shown in FIG. 2 is started, and the direct conversion rule except the intermediate table is generated from the conversion rule shown in FIG. 28.

The direct conversion rule created by the process of FIG. 2 is read from the conversion rule information, the table definition information, the data item definition information, the extraction rule information, and the item conversion rule information. The derived result may be displayed on the screen shown in FIG. 29, for example.

At last, the process of converting the data through the use of the conversion rule derived by the conversion rule deriving process described with reference to FIG. 2 will be described with an example of a process of converting the data of the first application program of FIG. 1 into the data of the second application program with reference to FIG. 30.

In the flowchart shown in FIG. 30, during execution, the conversion rule ID of the target record in the conversion rule information is taken as a parameter and then the value is stored in a variable R.

Herein, the description will be oriented to the application of the conversion rule ID 'R003' to the parameter.

At first, the process of the step 3001 is executed to search the record whose conversion rule ID is equal to R from the conversion rule information and store the reference input table of the record whose conversion rule ID is R in a variable Ti and the output table of the record in a variable Te.

In the illustrated example, R is 'R003'. This is the rule derived by the conversion rule deriving process. The target record is that shown in FIG. 11. Hence, 'T001' and 'T004' are stored in the variables Ti and Te.

In the loop of steps 3002 to 3007, in the case of applying the extraction rule whose conversion rule is R to the record of the table indicated by Ti, the extraction rule is operated to execute the process for each of the concerned records.

At first, in step 3002, the process is executed to search the record whose conversion rule is R from the extraction rule information, take one record corresponding to the extraction condition of the record out of Ti, and then store this record in a variable Ri.

In the illustrated example, R is 'R003'. Hence, the record whose conversion rule is 'R003' included in the extraction rule information is that shown in FIG. 12 according to the rule derived by the process of FIG. 2.

The extracting condition of the record of the extraction rule information indicated by FIG. 12 is 'StrChop (0, 2, "A001")=='03'", which represents the rule "two characters taken from the 0th position of the character string that is the content of the data "A001" are equal to the character string '03'". In FIG. 8, this rule applies to ten records, that is, the record whose organization code is '031000' to the record whose organization code is '033005'. The process to the step 3007 is executed with respect to those ten records.

Herein, the description will be oriented to the case that the record whose organization code is '31000' is stored in Ri.

In the loop of the steps 3003 to 3005, the process is executed about each of the data items belonging to the table indicated by Te.

In step 3003, the process is executed to take one record whose belonging table is Te from the data item definition information of FIG. 4 and then is stored in a variable Ao.

In the illustrated example, Te is 'T004'. Hence, in the data item definition information shown in FIG. 4, three records having item IDs of 'A009', 'A010' and 'A011' respectively fall upon to the record whose belonging table is 'T004'.

Herein, the description will be oriented to the case that the record whose item ID is 'A009' is stored in Ao.

In the step 3004, the process is executed to search a record whose conversion rule is R and output item is Ao from the item conversion rule information, calculate the value calculated by substituting the value of the data item in Ri to each data item ID of the character string defined by the output expression of the concerned record, and store the value in the data item corresponding to Ao of the output record Ro having the same data item as the data item.

In the illustrated example, R is 'R003'. The record whose Ao is 'A009', conversion rule is 'R003', and output item is 'A009' included in the item conversion rule information corresponds to the record whose item conversion rule ID is 'D008' shown in FIG. 13.

Since the output expression of this record is 'A001', the content of the data item indicated by 'A001' included in the record stored in Ri, that is, '031000' that is the content of the organization code of Ri is stored in the data item of Ro corresponding to Ao.

The step 3005 is the end of the loop started in the step 3003. The process from the steps 3003 to 3004 is executed about all the data items of Te.

As a result, at the end point of the loop, that is, the time point when the step 3006 is reached, the record stored in Ro includes the data item '031000' for the organization code, the data item 'Yokohama branch' for the organization name, and the data item 'NULL' for the upper organization code.

In step 3006, the record created in Ro is added to the table indicated by Te.

That is, the record having the organization code of '031000', the organization name of 'Yokohama branch', and the upper organization code of 'NULL' is added to the table of 'T004' indicated by Te.

Herein, the table T004 is located in the second database managed by the second application program shown in FIG. 1. On the other hand, the process of executing the conversion rule does not necessarily store the physical location and the physical access method of the table T004. It stores only the adapter ID 'ADP02' for accessing the table T004 from the table definition information shown in FIG. 3.

The first adapter 108 and the second adapter 109 shown in FIG. 1 provide the conversion rule executing unit with the application program and the interface that does not depend on the location.

The step 3007 is the end of the loop started in the step 3002. The process from the steps 3002 to 3007 is repeated about all the records falling upon the extraction condition of the extraction rule of all the records included in the reference input table.

This process makes it possible to create in the organization table 2 of the second application program the data for representing the mapping among the organization code, the organization name and the upper organization code of the Yokohama branch that is required by the second application program from the data held in the first application program.

In case the contents of the organization table 1 and the organization structure table held in the first application program are the same as shown in FIGS. 8 and 9, the content of the organization table 2 held in the second application program is the same as shown in FIG. 31 as a result of executing the process of FIG. 30.

The embodiment shown in FIG. 30 has concerned with the arrangement that the data conversion is executed by using the conversion rule information, the table definition information, the data item definition information, the extraction rule information, and the item conversion rule information. Alternatively, a program may be generated for executing the data conversion through the use of the conversion rule information, the table definition information, the data item definition information, the extraction rule information, and the item conversion rule information.

As set forth above, the conversion rule from the input data into the output data may be derived by executing the process of FIG. 2 after the operator defines the conversion rules from the input data into the intermediate data and from the intermediate data into the output data.

This system makes it possible to improve the execution performance and the processing efficiency given in the case of defining the direct conversion from the input data into the output data without through the intermediate data while enjoying the advantages given by the conversion through the intermediate data such as easy definition and easy maintenance. The reasons of the easy definition and easy maintenance are that the operator just needs to define the conversion rule between the intermediate data that is easily understood by the operator because of his or her definition and the data of each application program and if any data of the application program is changed in the associated system, the operator may easily maintain the system because of his good knowledge on the data.

That is, the method for temporarily creating the intermediate data needs to execute the conversion from the input data into the intermediate data and the other conversion from the intermediate data into the output data. Two conversions are required. Unlike this method, the present invention is arranged to derive the direct conversion rule in advance and apply this rule to the system. Hence, just one data conversion is required.

Further, the method for temporarily converting the input data into the intermediate data possibly converts even the input data that is irrelevant to the output data into the intermediate data. Unlike this method, the present invention is arranged not to process the data item of the intermediate data that is irrelevant to the output data, that is, not to reflect that kind of data on the derived conversion rule. Hence, no wasteful data conversion is carried out.

Moreover, according to the present invention, it may be checked if the conversion rule from the input data into the intermediate data is sufficiently defined for obtaining the intermediate data from the output data without executing the data conversion. This makes it possible for the operator to know if the conversion rule from the input data into the intermediate data is to be modified. The system therefore supports the definition of the consistent conversion rules by the operator.

As set forth above, according to the invention, the operator enables to define the conversion from the input data into the intermediate data and the other conversion from the intermediate data into the output data and execute the conversion rule deriving process, for the purpose of deriving the conversion rule from the input data into the output data.

This makes it possible for the operator to define the conversion rule between the intermediate data easily understood by the operator and the data of each application program. Hence, the definition is made easier. So is the maintenance if any system is changed in the associated systems.

The invention claimed is:

1. A system for deriving a data conversion rule for transferring data from a first system to a second system, wherein the derived data conversion rule is stored on a computer-readable medium, the system comprising:

storage means for storing a plurality of data conversion rules for converting a data format of data into another data format of the data;

input means for inputting a first data conversion rule ID identifying a first data conversion rule that converts a first data format used by the first system into a common type of intermediate data format, and inputting a second data conversion rule ID identifying a second data conversion rule that converts the intermediate data format into a second data format used by the second system;

extraction means for extracting the first data conversion rule and the second data conversion rule from said storage means by use of the first data conversion rule ID and the second data conversion rule ID; and conversion rule deriving means for deriving a new third data conversion rule for directly converting the first data format into the second data format not through the intermediate data format, wherein the new third data conversion rule is derived based on the first data conversion rule and the second data conversion rule and is stored on the computer-readable medium.

2. A system for deriving a data conversion rule according to claim 1, wherein the data includes a plurality of data items, each of said plurality of data conversion rules includes a plurality of data item conversion rules, each of said data item conversion rules converting a data item into another data item, said extraction means extracts a plurality of first data item conversion rules included in the first data conversion rule and a plurality of second data item conversion rules included in the second data conversion rule, and said conversion rule deriving means derives the third data conversion rule for converting the first data format into the second data format on a basis of the first and second data item conversion rules.

3. A system for deriving data conversion rule according to claim 2, wherein said storage means stores said plurality of data item conversion rules relating an output item showing data item format of a conversion to an output expression showing data item format of a conversion destination.

4. A system for deriving a data conversion rule according to claim 3, wherein said conversion rule deriving means extracts a second output item of a second data item conversion rule included in the second data conversion rule, extracts a second output expression related to the second output item, identifies a first data item conversion rule including a first output item corresponding to the second output item, extracts a first output expression of the first data item conversion rule, and generates a third data item conversion rule that relates the second output item as the output item to the first output expression as the output expression.

5. A data conversion apparatus for deriving a data conversion rule for transferring data from a first computer to a second computer, wherein the derived data conversion rule is stored on a computer-readable medium, the apparatus comprising:

an adapter connected to the first computer and the second computer via a network;

a storage unit for storing a plurality of data conversion rules for converting a data format of data into another data format of the data, and for storing a program; and a CPU connected to said adapter and said storage unit, said CPU inputting a first data conversion rule ID identifying a first data conversion rule that converts a first data format used by said first computer into a common type of intermediate data format, and inputting a second data conversion rule ID identifying a second data conversion rule that converts the intermediate data format into a second data format used by said second computer, said CPU extracting the first data conversion rule and the second conversion rule from said storage unit by use of the first data conversion rule ID and the second data conversion rule ID, and said CPU deriving a new third data conversion rule for directly converting the first data format into the second data format not through the intermediate data format, wherein the new third data conversion rule is derived based on the first data conversion rule and the second data conversion rule, according to said program, and is stored on the computer-readable medium.

6. A data conversion apparatus according to claim 5, wherein the data includes a plurality of data items, each of said plurality of data conversion rules includes a plurality of data item conversion rules, each of said data item conversion rules converting a data item into another data item, said CPU extracts a plurality of first item conversion rules included in the first data item conversion rule and a plurality of second data item conversion rules included in the second data conversion rule, and derives the third data conversion rule for converting the first data format into the second data format on a basis of the first and second data item conversion rules.

7. A data conversion according to claim 6, wherein
said storage unit stores said plurality of data item conversion rules relating to an output item showing data item format of a conversion to an output expression showing data item format of a conversion destination.

8. A data conversion apparatus according to claim 7, wherein said CPU
    extracts a second output item of a second data item conversion rule included in the second data conversion rule,
    extracts a second output expression related to the second output item,
    identifies a first data item conversion rule including a first output item corresponding to the second output item,
    extracts a first output expression of the first data item conversion rule, and
    generates a third data item conversion rule that relates to the second output item as the second output item to the first output expression as the output expression.

* * * * *